United States Patent Office 3,513,116
Patented May 19, 1970

3,513,116
PROCESS FOR THE POLYMERIZATION AND CO-POLYMERIZATION OF VINYL-FLUORIDE
Dario Sianesi and Gerardo Caporiccio, Milan, Italy, assignors to Montecatini Edison S.p.A., Milan, Italy, a corporation of Italy
No Drawing. Filed Jan. 10, 1966, Ser. No. 519,431
Claims priority, application Italy, Jan. 11, 1965,
366/65
Int. Cl. C08f 1/60, 3/22
U.S. Cl. 260—23                                16 Claims

ABSTRACT OF THE DISCLOSURE

Homopolymers and copolymers of vinyl fluoride are produced with the aid of a catalytic system consisting of a metalorganic lead or tin compound and an activating agent therefor which is an inorganic compound having oxidizing properties.

---

This invention relates to a process for preparing polymers of vinyl fluoride and copolymers of vinyl fluoride with other monomers containing an ethylenic unsaturation, and to the products obtained by such a process.

The process according to the invention makes it possible to obtain, under relatively moderate conditions of temperature and pressure, polymers and copolymers of vinyl fluoride characterized by a high molecular weight and by very good physical characteristics which render them attractive from the standpoint of commercial applications.

It is well known that tin and lead compounds containing metal-to-carbon bonds decompose by thermal or photo chemical action into free radicals which can start the polymerization of various monomers. It has, however, been ascertained that organic lead and tin compounds per se do not have the capacity of starting the polymerization and copolymerization of vinyl fluoride when they are used in the absence of photochemical activation and under moderate conditions of temperature and pressure.

It has now been found that certain specific agents, present in catalytic amount, are capable of promoting the catalytic activity of organic lead and tin compounds in initiating the polymerization and copolymerization of vinyl fluoride in the absence of the photochemical activation and at a temperature lower than 150° C.

The catalytic system used for the polymerization and copolymerization of vinyl fluoride consists of a metalorganic lead or tin compound and of an activating agent which is an inorganic compound having oxidizing properties.

The present invention relates, therefore, to a process for the preparation of high molecular weight vinyl fluoride polymers and copolymers, characterized in that vinyl fluoride is polymerized or copolymerized in the presence of a solvent or dispersing liquid medium at a temperature between —10° C. and +150° C., preferably between 10° C. and 100° C., and under a pressure between 1 and 250 atm., preferably lower than 150 atm., in the presence of polymerization initiators consisting of an inorganic oxidizing compound and an organometallic lead or tin compound in a molar ratio between 0.01 and 100.

The metalorganic compounds which contribute to form the new catalytic systems of the present invention are the lead and tin derivatives having the general formula $MR_2R'R''$ in which M is the tetravalent metal, lead or tin, the two R groups are the same or different radicals selected from the group consisting of aliphatic, aromatic and cycloaliphatic radicals, either substituted or unsubstituted, preferably, the linear or branched alkyl radicals containing from 1 to 6 carbon atoms. They can be substituted with one or more halogens, hydroxyl, amino, carboxylic amido and nitrile groups. R' and R'' are the same or different and are equal to R or selected from the group comprising hydrogen, halogen, hydroxyl, alkoxyl, thioalkoxyl, the anions of an inorganic oxyacid: e.g., derived from nitric, sulfuric, sulfurous acid, and of an organic acid containing one or more carbon atoms, e.g., formic, acetic and stearic acid, or both R' and R'' can be substituted by an oxygen or sulfur atom. In this case the metalorganic product can be of a polymeric nature.

Illustrative examples of these compounds can be: tetraethyl lead, tetraethyl tin, tetramethyl lead, tetraphenyl lead, tetrapropyl lead, tetrabutyl lead, diethyldipropyl lead, ethyltriphenyl lead, diethylmethylpropyl lead, chloromethyltriethyl lead, 2 - hydroxyethyl-triphenyl tin, 3-diethylaminopropyl-triethyl lead, tripropyl-stannyl - 2 - hydroxyethylacetate, tripropylstannylpropionamide, tripropyl-stannylpropionic acid, triethyl lead chloride, triethyl tin fluoride, triethyltin chloride, triethyl tin iodide, triethyl lead hydroxide, triethyl tin hydride, diethyl tin dihydride, diethyl tin dichloride, diethyl lead dichloride, diethyl lead oxide, triethyl lead acetate, triethyl lead nitrate, diethyl lead sulfite.

Other organometallic compounds of lead and tin, which are not included in the preceding general formula, but when activated with oxidizing compounds, can also act as initiators of the polymerization and copolymerization of vinyl fluoride according to the present process, are e.g., hexa-alkyl-diplumbanes, hexalkyldistannanes, alkylstannonic acids, alkylplumbonic acids, and their alkyltrihalodenhydric derivatives. Examples are hexamethyldistannane, hexaethyl diplumbane, methylstannonic acid, methylplumbonic acid, methyl tin triiodide and methyl lead trichloride.

All these derivatives can be prepared according to known processes. See e.g., R. W. Leeper, L. Summer, R. Gilmann, Chem. Rev., 1954, pages 102–167; G. E. Coates, Organometallic Compounds, 2nd Edition, 1960, Methuen, pages 167–213.

The inorganic activating agents having oxidizing properties which, according to the present invention, can promote the catalytic activity of metalorganic compounds of lead and tin in the polymerization and copolymerization of vinyl fluoride, can be of either neutral, basic or acidic nature.

Illustrative but not limitative examples of these compounds are: salts of alkali metals or alkali-earth metals, ammonium salts, and in general salts of mono- or polyvalent cation with chromic, permanganic, periodic, chloric, perchloric, chlorous, hypochlorous, persulfuric acid; or oxidizing compounds of acid nature, e.g., nitric, perchloric acid, etc., or derivatives of metals, having multiple valence, present in a state of higher valence, such as e.g., salts of tetravalent cerium, ferric salts, etc.

According to the present invention the chemical interaction between the metalorganic compound and the oxidizing compound in the said ratios and conditions promotes the quick polymerization and copolymerization of vinyl fluoride even when operating at a temperature below 150° C.

It appears to be beneficial for the oxidizing activating compound to be added to the metalorganic initiator compound so that the interaction between the two components of the catalytic system takes place in the presence of the monomer or monomers to be polymerized.

The activity of the catalytic system thus formed, as regards both the polymerization rate and the characteristics of the polymer obtained, depends not only on the well known factors which regulate the polymerization reactions, including, concentration of the reactants, nature of the solvent or dispersing agent, temperature and pressure, presence or absence of chain transfer agents, but also on factors more strictly connected with the method of reaction between the activator component and the metalorganic initiator such as the ratio between the two catalytic agents, and the characteristics of the medium in which their interaction occurs. For each of the binary catalytic systems of the present invention, the other operative factors being the same, there is observed a variation of catalytic activity as a function of the molar ratio between oxidizing activating compound and metalorganic initiator. It has been found that the molar ratio between oxidizing activator compound and metalorganic initiator compound must be between 0.01 and 100 is preferably between 0.05 and 10.

The introduction of one of the two catalytic components can obviously be suitably graduated during the polymerization course so as to regulate the time and course of the reaction. If this is done, the ratio between the two catalytic agents varies with time, and the aforementioned values must be considered as final values.

In general, the metalorganic compound of lead or tin can be used in amounts varying from 0.01 and 10 parts by weight per 100 parts of monomer or monomers to be polymerized. This amount is preferably between 0.1 and 5 parts per 100 parts by weight of monomer.

The process according to the present invention can be conveniently carried out by operating in the presence of water. On the other hand, the presence of water often is inevitably bound to the oxidizing activator, e.g., as hydration or solution water, when it is introduced. Also, often the oxidant cannot exert the interaction with the metalorganic compound without the contribution of the products of ionic dissociation of water. Whater can conveniently be the only dispersing or suspending medium used in the polymerization or copolymerization of vinyl fluoride.

The polymerization can also be carried out in the presence of an organic liquid, as the solvent or dispersing agent of the monomeric phase and of the catalytic reactants, either in the presence or absence of water. These organic liquids must be such that thay do not react with the oxidizing activator compound to the detriment of the interaction between the oxidizing activator and the metalorganic initiator. Thus, the selection of the organic medium depends on the nature of the activator used. Examples of organic solvents that can be used either in the presence or absence of water, are: alcohols, ketones, esters, ethers, amides, either substituted or not on the nitrogen atoms, dimethylsulfoxide, hydrocarbons, halogenated hydrocarbons, nitriles, etc. Preferable solvents according to the present process are methanol, tert. butyl alcohol, ethyl acetate, dimethylsulfoxide, acetone, methylene chloride.

The amounts of water, solvent, dispersing agent, or of aqueous-organic mixture to be used can vary in general from 0.01 to 50 parts per 1 part by weight of monomer, preferably between 0.05 and 20 parts per 1 part by weight on monomer.

In the polymerization system the conventional emulsifiers and buffering agents according to the well known techniques in the polymerization field can also be introduced.

According to the present process the polymerization and copolymerization of vinyl fluoride can be carried out continuously or batchwise, at a temperature between −10° C. and 150° C. and preferably between 10° and 100° C. The pressure can vary between 1 and 250 atm. Usually it is between 10 and 150 atm.

Polyvinylfluoride, obtained according to the present process, is a highly crystalline polymer. The temperature of complete crystalline melting is normally higher than 200° C., and usually between 200° C. and 235° C. It has a high molecular weight and its intrinsic viscosity normally appears to be higher than 0.3 and lower than 8 (100 cc./g.). These properties can suitably be regulated within desired limits for particular applications by regulating the normal operative factors of the polymerization, including temperature, monomer concentration, concentration of the catalytic agents.

The present invention also include obtaining copolymers of vinyl fluoride with various other monomers having ethylenic unsaturation by using the polymerization catalytic systems herein described. The monomers that can be copolymerized with vinyl fluoride can be partially or completely halogenated olefins, such as, e.g. vinyl chloride, vinylidene fluoride, trifluorochloroethylene, tetrafluoroethylene, 2-fluoropropene, 3,3,3-trifluoropropene, 1,1,3,3,3 - pentafluoropropene, 1,2,3,3,3-pentafluoropropene, and perfluoropropene. Other copolymers can be obtained from vinyl fluoride with vinyl, acrylic, methacrylic esters, with acrylonitrile, with amides and unsaturated ethers, etc. These non-halide comonomers can be polymerzized with vinyl fluoride under the same conditions as the halide comonomers.

By using the polymerization initiators of this invention in the copolymerization of vinyl fluoride with one or more of the aforementoned monomers, copolymers can be obtained in which the content of vinyl fluoride monomer is between 1 and 99% by mols. The physical properties of these copolymers obviously vary depending on the nature of the comonomer used and on the composition of the copolymer. In general, the copolymers containing not less than 50% by mols of units derived from vinyl fluoride are preferred so that the very good basic properties of polyvinylfluoride are maintained in the product, while other desired characteristics are provided by the presence of the comonomeric units. Some characteristics of the vinyl fluoride homopolymer such as, the physical and chemical resistance and the ease of processing can thus be further improved by the presence of comonomers. From this standpoint, particularly preferred are the copolymers of vinyl fluoride containing more than 2% and less than 50% by mols of units derived from tetrafluoroethylene, vinylidene fluoride, trifluorochloroethylene, perfluoropropene and 1-hydropentafluoropropene.

Now are reported some examples, having illustrative and not limitative character, of the polymerization and copolymerization of vinyl fluoride according to the present invention.

EXAMPLE 1

150 cc. of a 0.04 molar solution of $Pb(C_2H_5)_4$ in pure and oxygen-free tert. butyl alcohol are introduced by siphoning into a stainless steel autoclave, having capacity of 1,000 cc. provided with mechanical agitator and thermostatic jacket. 250 g. of vinyl fluoride are then introduced into the autoclave. The mixture thus obtained is maintained at 40° C. while agitating and then, through a liquid feeding pump, 60 cc. of a deaerated aqueous solution of 3% ammonium persulfate and 1% borax are introduced.

The reaction is controlled by keeping the temperature at 40° C. and the whole is reacted for 20 hours while continuously agitating. At the end of this time, the unreacted monomer is removed. The polymer formed is collected, washed with warm aqueous methanol acidified with $HNO_3$, washed with boiling pure methanol, dried to constant weight at 100° C. under a vacuum of 25 mm. Hg, and finally weighed. 162 g. of polyvinylfluoride are obtained.

A sample of this polymer at the elementary analysis shows a C, H and F content perfectly corresponding to that calculated for $C_2H_3F$. The temperature of complete crystalline melting, determined on the polarizing microscope provided with a heating plate, appears to be between 205 and 215° C. Samples of the polymer, by heating to 160° C. with a fixed amount of dimethylsulfoxide, give homogeneous solutions. Upon cooling, polymer gels are obtained. They can be extruded at 200° C. and after removal of the residual solvent, flexible and resistant films and fibers which are stretchable at low temperature can be obtained. Moulded laminae of the polymer after being annealed at 100° C. for 4 hours, result in a density of 1.39 g./cc. at 25° C. as determined by flotation.

EXAMPLE 2

5 cc. of 1% ammonium persulfate solution in 80% tert. butyl alcohol, 2 cc. of aqueous 1% sodium stearate solution and 0.065 g. of Pb($C_2H_5$)$_4$ are introduced, in that order, at intervals of 5 minutes in order to let the solutions of reactants introduced solidify, into a small 50 cc. autoclave kept under a nitrogen atmosphere and cooled to −78° C. The autoclave is closed, vacuum is applied and, while keeping it at −78° C., 10 g. of vinyl fluoride are introduced by vacuum distillation. The contents of the autoclave are allowed to react for 14 hours while agitating in a thermostatic bath at 48° C. At the end of this time, with the usual techniques, 8.6 g. of polymer are obtained.

This polymer is slightly soluble in dimethylformamide and soluble in dimethylsulfoxide at 150° C. A 0.15% solution of this polymer obtained in dimethylformamide after 3 hours of heating, while agitating, to 130° C. and then maintained at 100° C., showed, at this temperature, an intrinsic viscosity of about 3 (100 cc./g.). The polymer showed a temperature of complete crystalline melting, determined with the polarizing microscope, of 200–210° C. By cooling ten degrees below the melting temperature range the polymer re-crystallizes very rapidly.

EXAMPLE 3

Into the 50 cc. autoclave described in Example 2, the following are introduced under inert atmosphere: 0.04 g. of borax, 20 cc. of distilled and deaerated water, and 0.065 g. of Pb($C_2H_5$)$_4$. After closing the autoclave and cooling to −78° C., 10 g. of vinyl fluoride are introduced by distillation under vacuum. The whole is kept at 40° C. and after 30 minutes 5 cc. of an aqueous 1% ammonium persulfate solution are fed into the autoclave by pumping under pressure. After polymerization for 40 hours at 40° C., while agitating, 1.8 g. of polyvinylfluoride dispersed in the form of small homogeneous particles, of regular size, are obtained.

This polymer is insoluble in dimethylformamide at 130° C. But it is soluble in dimethylsulfoxide at 150° C., thus forming a homogeneous solution which, when cooled, gives a polymer gel. The gel can be moulded at 200° C. and laminae having very good mechanical properties can be obtained.

EXAMPLE 4

0.05 g. of ammonium persulfate, 2 cc. of de-aerated water, 5 cc. of tert. butyl alcohol, 0.065 g. of Pb($C_2H_5$)$_4$ and finally, 7 g. of vinyl fluoride by vacuum distillation, are introduced successively at intervals of 5 minutes into the 50 cc. autoclave described in Example 2, cooled to −78° C., and kept under an inert atmosphere. The autoclave is placed to react, while vigorously agitating, in bath kept at the temperature of 75° C.

After 2 hours of reaction 0.95 g. of a polymer having an intrinsic viscosity of 0.78 (100 cc./g.) determined in dimethylformamide at 110° C. are obtained.

EXAMPLE 5

0.05 g. of ammonium-cerium hexanitrate, 1 cc. of dimethylsulfoxide, 0.065 g. of Pb($C_2H_5$)$_4$, and then 10 g. of vinyl fluoride introduced by vacuum distillation, are introduced successively at intervals of 5 minutes into a 50 cc. autoclave cooled to −78° C. and kept under an inert atmosphere. The whole is reacted for 16 hours at 40° C. 1.3 g. of polymer having an intrinsic viscosity, in dimethylformamide at 110° C., of 0.99 (100 cc./g.) are obtained.

A sample of the polymer thus obtained is subjected to thermal analysis, carried out with a Perkin-Elmer differential calorimeter.

A melting point of about 220° C. is obtained.

EXAMPLE 6

By using the same charging technique as given in Example 4, the following are charged successively: 0.025 g. of ammonium-ceric nitrate, 1 g. of water, 5 cc. of tert. butyl alcohol, 0.065 g. of Pb($C_2H_5$)$_4$, and 10 g. of vinyl fluoride. After 16 hours of reaction at 40° C., 2 g. of polymer having an intrinsic viscosity of 1.34 (100 cc./g.) in dimethylformamide at 110° C., are obtained.

EXAMPLE 7

By performing the same experiment as in Example 6 but with 0.05 g. of ceric salt instead of 0.025 g., 0.7 g. of polymer having an intrinsic viscosity of 0.95 (100 cc./g.) are obtained.

EXAMPLE 8

0.01 g. of ammonium persulfate, 10 cc. of pure acetone, 0.05 g. of Pb($C_2H_5$)$_4$, and 1.5 g. of vinyl fluoride are introduced into a Pyrex glass vial having a capacity of 20 cc. The vial is provided with a two-way device for the introduction of the reactants under an inert atmosphere. During the introduction of the reactants the vial is cooled to the temperature of liquid nitrogen. The vial is then sealed and kept in a bath at 30° C. for 60 hours under agitation. At the end of the reaction, after cooling to −78° C., the vial is opened.

0.6 g. of polymer having an intrinsic viscosity of 0.16 (100 cc./g.) in dimethylformamide at 110° C. are recovered.

EXAMPLE 9

The same experiment as described in Example 8, carried out in methanol instead of acetone, yields, after the same time, at the same temperature, 0.35 g. of polymer having an intrinsic viscosity of 0.11 (100 cc./g.) in dimethylformamide at 110° C.

EXAMPLES 10–11–12

These experiments were carried out in 50 cc. stainless steel autoclave with the following technique:

Into the autoclaves, cooled to −78° C. and kept under an inert atmosphere, the amounts of aqueous sodium hypochlorite reported in Table I are successively introduced, with water, up to a total volume of 2 cc. This solution is allowed to solidify in the autoclave. 5 cc. of tert. butyl alcohol, 0.2×10⁻³ g.-mols of Pb($C_2H_5$)$_4$, and finally 10 g. of vinyl fluoride are added. The autoclaves are then placed in a bath kept at 40° C. and allowed to react for 16 hours.

At the end of the reaction the unreacted monomer is removed. The polymer is quantitatively collected, washed with 80% methanol, acidified with $HNO_3$, then with pure methanol at the boiling point, and then dried to constant weight at 100° C. under vacuum of 15 mm. Hg. The results are reported in Table I.

The determination of the intrinsic viscosity is carried out in dimethylformamide solution at 110° C. with 0.2–0.4% of polymers.

TABLE I

| | Sodium hypochlorite g.×10⁻³ equiv. | Polymer obtained (residue of boiling $CH_3OH$, g.) | Intrinsic viscosity (100 cc./ g. in DMf at 110° C.) |
|---|---|---|---|
| Example No.: | | | |
| 10 | 0.4 | 0.8 | 0.86 |
| 11 | 1 | 1.4 | 1.1 |
| 12 | 1.5 | 0.3 | 0.2 |

EXAMPLE 13

0.03 g. of $NaIO_4$ dissolved in 1 cc. of 0.02 N $H_2SO_4$, 10 cc. of tert. butyl alcohol, 0.1 cc. of Pb($C_2H_5$)$_4$ and finally, by vacuum distillation, 10 g. of vinyl fluoride are successively introduced at intervals of 5 minutes into a 50 cc. autoclave kept under inert atmosphere and cooled to —78° C. The whole is reacted at 45° C. while agitating for 16 hours.

0.45 g. of polymer having an intrinsic viscosity of 1.2 (100 cc./g.) in dimethylformamide at 110° C. are obtained. This polymer has a temperature of complete crystalline melting of 225–230° C. determined by the polarizing microscope.

An experiment carried out in an analogous manner but in the absence of $NaIO_4$, at the same temperature and for the same polymerization reaction time does not result in any polymer formation

EXAMPLE 14

0.5 cc. of N/l. nitric acid, 10 cc. of tert. butyl alcohol, 0.1 cc. of $Pb(C_2H_5)_4$ and 8 g. of vinyl fluoride are introduced into a 50 cc. autoclave, under inert atmosphere with the technique described in Examples 10–12

After 20 hours of reaction at 40° C., 0.4 g. of polymer, having an intrinsic viscosity of 0.12 (100 cc./g. in dimethylformamide at 110° C.) and a temperature of complete crystalline melting of 205–215° C. determined by the polarizing microscope, are obtained,

EXAMPLE 15

Again with the same technique used in Examples 10–12 in a 50 cc. autoclave there are placed to react: 5 cc. of a 0.1 N aqueous $KMnO_4$ solution, 10 cc. of tert. butyl alcohol, 0.5 cc. of N/l. $H_2SO_4$, and 0.1 cc. of $Pb(C_2H_5)_4$. After 25 hours of reaction with 10 g. of vinyl fluoride at 45° C., 0.3 g. of polymer having an intrinsic viscosity of 0.85 (100 cc./g.) measured in dimethylformamide at 110 ° C., are obtained.

EXAMPLE 16

Into a Pryex glass vial having a capacity of 20 cc. and provided with a two-way neck for the introduction of the reactants in an inert atmosphere, and cooled to —180° C., under a nitrogen atmosphere, there are successively introduced: 1 cc. of a 0.5 N sodium hypochlorite solution, 10 cc. of methanol, $0.2 \times 10^{-3}$ g. mols of $Pb(CH_3)_4$, and finally 1.5 g. of vinyl fluoride, introduced by vacuum distillation. The vial is sealed and placed to react in the absence of light at 30° C. for 24 hours.

0.25 g. of polymer are obtained.

EXAMPLE 17

Into a 50 cc. autoclave cooled to —78° C. and kept under an inert atmosphere there are successively introduced at intervals of 5 minutes: 0.05 g. of ammonium persulfate dissolved in 1 cc. of distilled and deaerated water, 5 cc. of tert. butyl alcohol, 0.05 g. of tetraphenyl lead dissolved in 2 cc. of $CH_2Cl_2$, and finally 10 g. of vinyl fluoride, introduced by vacuum distillation. The whole is reacted for 24 hours at 50° C. while continuously agitating.

0.3 g. of polymer having a temperature of complete crystalline melting of about 215° C., determined by the polarizing microscope are obtained. The polymer has an intrinsic viscosity of 0.3 (100 cc./g.) determined in dimethylformamide at 110° C.

EXAMPLES 18–19–20

Into a series of Pyrex glass vials cooled to the temperature of liquid nitrogen, having the capacity of 20 cc., provided with a two-way device for the introduction of the reactants, under an inert atmosphere, there are introduced successively: 1 cc. of 0.5 N sodium hypochlorite solution, 5 cc. of methanol and $0.1 \times 10^{-3}$ g. mols of the metalorganic compounds reported in Table II, suspended or dissolved in 5 cc. of methanol. 1.5 g. of vinyl fluoride are finally introduced by vacuum distillation. The vials are sealed and are placed to react in a bath kept at 30° C. for 24 hours, in the absence of light.

The results obtained are reported in Table II.

TABLE II

| Example No.: | Metalorganic compound ($0.1 \times 10^{-3}$ g. mols) | Polymer obtained (residue from boiling $CH_3OH$) g. |
|---|---|---|
| 18 | $Sn(C_2H_5)_4$ | 0.40 |
| 19 | $Sn(C_2H_5)_3H$ | 0.25 |
| 20 | $Sn(C_2H_5)_2Cl$ | 0.2 |

EXAMPLES 21–22–23–24

Into a series of Pyrex glass vials having the capacity of 20 cc., of the type used in preceding Examples 18–20, cooled to the temperature of liquid nitrogen, there are introduced successively: 0.02 g. of ammonium persulfate dissolved in 0.5 cc. of water, $0.1 \times 10^{-3}$ g. mols of the metalorganic compounds reported in Table III, suspended in 10 cc. of methanol and then, after the introduction of 1.5 g. of vinyl fluoride by vacuum distillation, the vials are sealed and placed to react in a bath kept at 30° C., for 24 hours while continuously agitating.

The results reported in Table III are obtained.

TABLE III

| Example No.: | Metalorganic compound ($0.1 \times 10^{-3}$ g. mols) | Polymer obtained, g. (residue from $CH_3OH$) | Intrinsic viscosity 100 cc./g. (DMF 110° C.) |
|---|---|---|---|
| 21 | $(C_2H_5)_2Pb(NO_3)_2$ | 0.58 | 0.21 |
| 22 | $(C_2H_5)_2Pb(OH)_2$ | 0.45 | 0.15 |
| 23 | $(C_2H_5)_2PbCl_2$ | 0.6 | 0.25 |
| 24 | $(C_2H_5)_2PbSO_3$ | 0.3 | 0.25 |

EXAMPLES 25–26–27–28

These examples are directed to the copolymerization of vinyl fluoride with other fluorinated olefins.

Into a series of 50 cc. stainless steel autoclaves cooled to —78° C. and kept in a nitrogen atmosphere, there are successively introduced at intervals of 5 minutes: 2 cc. of 2% aqueous ammonium persulfate solution, 5 cc. of tert. butyl alcohol, $0.2 \times 10^{-3}$ g. mols of $Pb(C_2H_5)_4$. Then in the different autoclaves there are introduced, by vacuum distillation at —78° C., 0.2 g. mol of the gaseous mixtures indicated in Table IV and obtained by mixing, so as to obtain a mixture containing 90% by mols of vinyl fluoride. The polymerization is carried out at 40° C. for 6 hours.

The results are reported in Table IV.

TABLE IV

| Ex. No. | Comonomer | Polymer obtained, residue from boiling $CH_3OH$ | Intrinsic viscosity 100 cc./g. DMF 110° C. | Temperature of complete crystalline melting, ° C. | Vinyl fluoride in the polymer |
|---|---|---|---|---|---|
| 25 | $H_2C=CF_2$ | 1.1 | 1.5 | 225–231 | 98.3 |
| 26 | $F_2C=CF_2$ | 5.2 | 1.85 | 212–240 | 86.4 |
| 27 | $F_3C-FC=CF_2$ | 0.8 | 0.93 | 160 | 90.6 |
| 28 | $F_3C-CF=CFH$ | 0.95 | 0.98 | 150–170 | 90.7 |

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. Process for the preparation of a member selected from the group consisting of high molecular weight vinyl fluoride homopolymers and high molecular weight copolymers of vinyl fluoride, comprising polymerizing vinyl fluoride alone or with another monomer containing monoethylenic unsaturation, in a liquid medium, at a temperature between $-10°$ C. and $+150°$ C., and at a pressure between 1 and 250 atmospheres, and in the presence of polymerization initiators consisting of (1) an inorganic oxidizing compound selected from the group consisting of (A) perchloric acid, (B) alkali metal, alkali earth metal, and ammonium salts of chromic, permanganic, manganic, periodic, iodic, bromic, chloric, chlorous, hypochlorous and persulfuric acids, and ferric salts; and (2) a metalorganic compound in which the metal is selected from the group consisting of lead and tin, in a molar ratio of (1) to (2) between 0.01 and 100, the amount of (2) being from about 0.01 to about 10 parts per 100 parts by weight of the vinyl fluoride or mixture thereof with the other monomer containing monoethylenic unsaturation.

2. A process according to claim 1, in which the oxidizing compound is a salt of a cation of an acid selected from the group consisting of chromic, permanganic, manganic, periodic, iodic, bromic, chloric, chlorous, hypochlorous and presulfuric acid.

3. A process according to claim 1, characterized in that the oxidizing compound is a salt of a metal selected from the group consisting of alkali metals and alkali-earth metals.

4. A process according to claim 1, in which the oxidizing salt is an ammonium compound.

5. A process according to claim 1, in which the inorganic oxidizing compound is perchloric acid.

6. A process according to claim 1, in which the inorganic oxidizing compound is a ferric salt.

7. A process according to claim 1, in which the liquid medium is selected from the group consisting of water, organic liquids which do not impede interaction between the oxidizing compound and the metalorganic compound, and mixtures thereof.

8. A process according to claim 7, in which the liquid medium is present in an amount between 0.01 and 50 parts per part by weight of monomer.

9. A process according to claim 7 wherein the organic liquid is selected from the class consisting of alcohols, ketones, esters, ethers, amides, sulfoxides, hydrocarbons and halogenated hydrocarbons.

10. A process according to claim 1, in which the monomer containing ethylenic unsaturation is selected from the group consisting of vinyl chloride, vinylidene fluoride, trifluorochloroethylene, 1,1,3,3,3-pentafluoropropene, 1,2,3,3,3-pentafluoropropene, tetrafluoroethylene, 2-fluoropropene, 3,3,3-trifluoropropene, perfluoropropene, vinyl esters, acrylic esters, methacrylic esters, acrylonitrile, amides and unsaturated ethers.

11. A process according to claim 1 characterized in that the metalorganic compound is represented by the formula $MR_2R'R''$ in which M is selected from the group consisting of lead and tin, the two R groups are organic radicals, the same or different from each other, and are selected from the group comprising aliphatic, aromatic, and cycloaliphatic radicals, R' and R'' are radicals which are the same or different from each other, and are selected from the group consisting of aliphatic, aromatic, cycloaliphatic, hydrogen, halogen, hydroxyl, alkoxyl, thioalkoxyl, the anions of an inorganic oxyacid, the anions of an organic acid containing one or more carbon atoms, oxygen atoms, and sulfur atoms.

12. A process according to claim 11 in which the inorganic oxyacid is selected from the group consisting of nitric, sulfuric and sulfurous acids.

13. A process according to claim 11 in which the organic acid is selected from the group consisting of formic, acetic, and stearic acids.

14. A process according to claim 1 in which the metalorganic compound is selected from the group consisting of hexaalkyldiplumbanes, hexaalkyldistannanes, alkylstannonic acids, alkyl plumbonic acids, the alkyltrihalogenhydric derivatives of alkylstannonic acids and alkyltrihalogenhydric derivatives of alkyl plumbonic acids.

15. A process according to claim 11, characterized in that the metalorganic compound is selected from the group consisting of tetraethyl lead, tetraethyl tin, tetramethyl lead, tetraphenyl lead, tetrapropyl lead, tetrabutyl lead, diethyldipropyl lead, ethyl triphenyl lead, diethyl methylpropyl lead, chloromethyl-triethyl lead, 2-hydroxyethyl-triphenyl tin, 3-diethylaminopropyl-triethyl lead, tripropylstannyl-2-hydroxyethylacetate, tripropyl stannylpropionamide, tripropylstannyl-propionic acid, triethyl lead, chloride, triethyl tin fluoride, triethyl tin chloride, triethyl tin iodide, triethyl lead hydroxide, triethyl tin hydride, diethyl tin dihydride, diethyl tin dichloride, diethyl lead dichloride, diethyl lead oxide, triethyl lead acetate, triethyl lead nitrate and diethyl lead sulfite.

16. A process according to claim 14, in which the metalorganic compound is selected from the group consisting of hexamethyldistannane, hexaethyl diplumbane, methylstannonic acid, methylplumbonic acid, methyl tin triiodide and methyl lead trichloride.

References Cited

UNITED STATES PATENTS

| | | | |
|---|---|---|---|
| 3,110,704 | 11/1963 | Halliwell | 260—92.1 |
| 3,193,543 | 7/1965 | Ragazzini | 260—92.1 |
| 3,245,971 | 4/1966 | Iserson | 260—92.1 |
| 3,331,823 | 7/1967 | Sianesi et al. | 260—87.7 |
| 3,382,223 | 5/1968 | Borsini et al. | 260—92.8 |
| 3,401,155 | 9/1968 | Borsini et al. | 260—87.7 |

DONALD E. CZAJA, Primary Examiner

R. A. WHITE, Assistant Examiner

U.S. Cl. X.R.

260—85.5, 86.3, 87.1, 87.5, 87.7, 92.1